US012705903B2

(12) United States Patent
Gupta et al.

(10) Patent No.: US 12,705,903 B2
(45) Date of Patent: Aug. 11, 2026

(54) SYSTEMS AND METHODS FOR DETECTING AND TRACKING OBJECTS IN AN ENVIRONMENT OF AN AUTONOMOUS VEHICLE

(71) Applicant: Kodiak Robotics, Inc., Mountain View, CA (US)

(72) Inventors: Suchir Gupta, Ada, MI (US); Collin C. Otis, Driggs, ID (US); Cole M. Miles, Mountain View, CA (US); Philip C. Du Toit, Fort Collins, CO (US); Andreas Wendel, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 621 days.

(21) Appl. No.: 18/065,711

(22) Filed: Dec. 14, 2022

(65) Prior Publication Data

US 2024/0203130 A1 Jun. 20, 2024

(51) Int. Cl.
*B60Q 1/28* (2006.01)
*B60Q 1/30* (2006.01)
(Continued)

(52) U.S. Cl.
CPC ............ *G06V 20/58* (2022.01); *G06N 20/00* (2019.01)

(58) Field of Classification Search
USPC ............... 382/100–159; 706/1–62, 900–905; 901/1–3
See application file for complete search history.

(56) References Cited

U.S. PATENT DOCUMENTS 11,010,907 B1 5/2021 Bagwell
11,016,495 B2 * 5/2021 Palanisamy ............ G06N 3/044
(Continued)

FOREIGN PATENT DOCUMENTS

JP 2021082294 A 5/2021

OTHER PUBLICATIONS

Ess, A et al.: "Robust Multiperson Tracking from a Mobile Platform", IEEE Transactions on Pattern Analysis and Machine Intelligence, IEEE Computer Society, USA, vol. 31, No. 10, Oct. 1, 2009 (Oct. 1, 2009), pp. 1831-1846.
(Continued)

*Primary Examiner* — Marcellus J Augustin
(74) *Attorney, Agent, or Firm* — Fox Rothschild LLP

(57) ABSTRACT

This disclosure provides methods and systems for detecting and tracking objects in an environment of an autonomous vehicle. The method may include: receiving sensor data from at least one sensor of the autonomous vehicle, the sensor data representative of one or more portions of an object in the environment of the autonomous vehicle; determining a highest confidence portion of the object, wherein the highest confidence portion of the object comprises a portion of the object that is observed and estimated with highest accuracy and confidence; determining features of the highest confidence portion of the object; training a machine learning model based at least in part on the features of the highest confidence portion of the object and an error metric that measures difference between the highest confidence portion of the object and a corresponding portion of the object in a ground truth; and detecting or tracking one or more objects in the environment of the autonomous vehicle using the trained machine learning model.

28 Claims, 7 Drawing Sheets

(51) Int. Cl.

| | |
|---|---|
| ***B60Q 1/32*** | (2006.01) |
| ***B60W 30/17*** | (2020.01) |
| ***B60W 40/00*** | (2006.01) |
| ***G06N 20/00*** | (2019.01) |
| ***G06V 20/58*** | (2022.01) |

(56) References Cited

U.S. PATENT DOCUMENTS

| | | | | |
|---|---|---|---|---|
| 11,934,955 | B2 * | 3/2024 | Arar | G06N 3/045 |
| 2019/0258878 | A1 * | 8/2019 | Koivisto | G05D 1/00 |
| 2020/0241545 | A1 * | 7/2020 | Anthony | G05D 1/0088 |
| 2020/0249685 | A1 * | 8/2020 | Elluswamy | G06V 20/588 |
| 2021/0046927 | A1 | 2/2021 | Miller et al. | |
| 2021/0253131 | A1 * | 8/2021 | Sen | G01S 7/4808 |
| 2021/0365707 | A1 | 11/2021 | Mao et al. | |
| 2022/0234502 | A1 | 7/2022 | Diessner | |
| 2022/0284222 | A1 * | 9/2022 | Pan | B60R 11/04 |
| 2022/0348227 | A1 * | 11/2022 | Foster | B60Q 1/507 |
| 2023/0192077 | A1 * | 6/2023 | Tairbekov | B60W 30/0956 701/301 |
| 2024/0085908 | A1 * | 3/2024 | Urtasun | G01S 17/86 |

OTHER PUBLICATIONS

Ess A et al.: "Object Detection and Tracking for Autonomous Navigation in Dynamic Environments", The International Journal of Robotics Research, vol. 29, No. 14, Dec. 1, 2010 (Dec. 1, 2010), pp. 1707-1725.

* cited by examiner

Figure 4A:
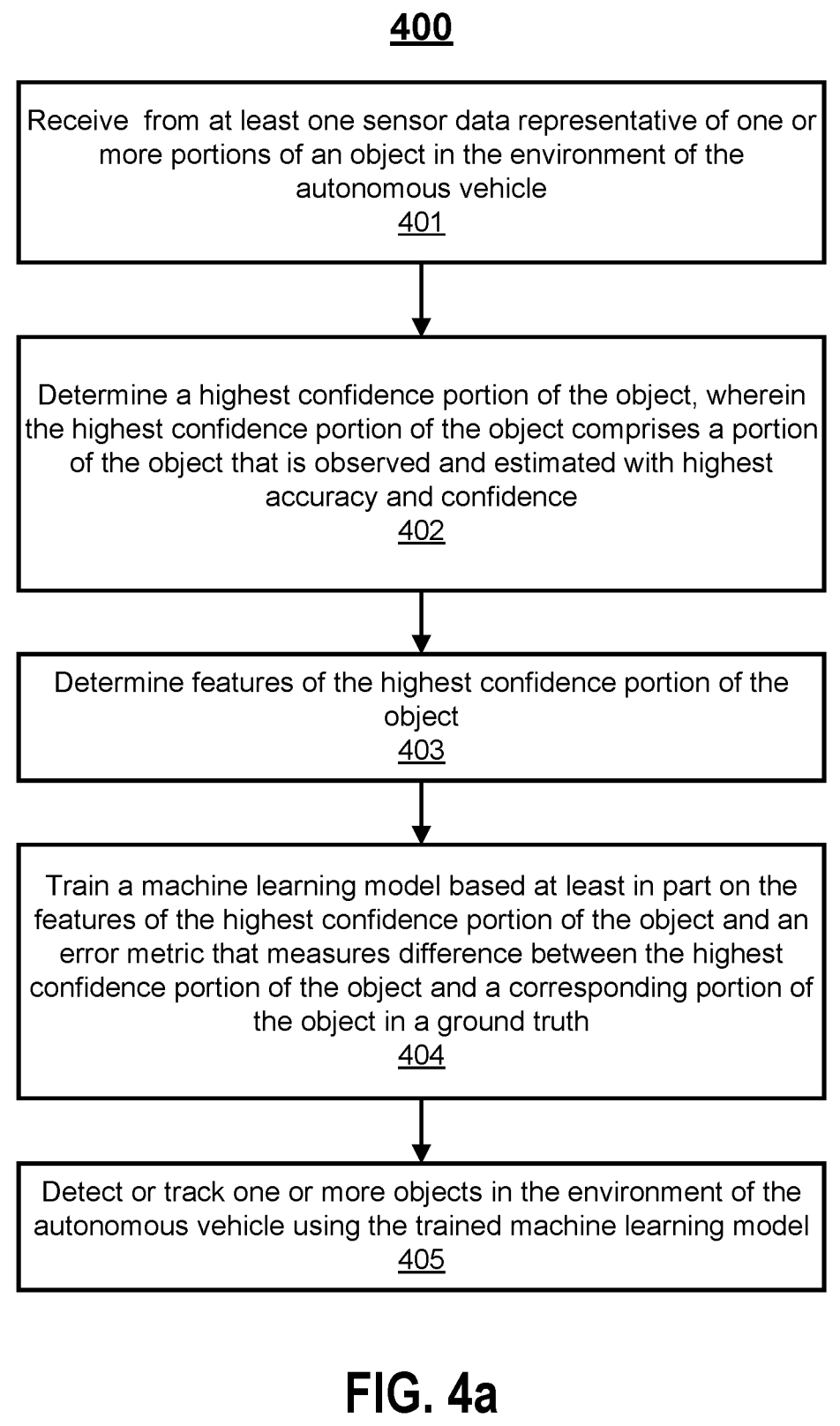

400

Receive from at least one sensor data representative of one or more portions of an object in the environment of the autonomous vehicle
401

Determine a highest confidence portion of the object, wherein the highest confidence portion of the object comprises a portion of the object that is observed and estimated with highest accuracy and confidence
402

Determine features of the highest confidence portion of the object
403

Train a machine learning model based at least in part on the features of the highest confidence portion of the object and an error metric that measures difference between the highest confidence portion of the object and a corresponding portion of the object in a ground truth
404

Detect or track one or more objects in the environment of the autonomous vehicle using the trained machine learning model
405

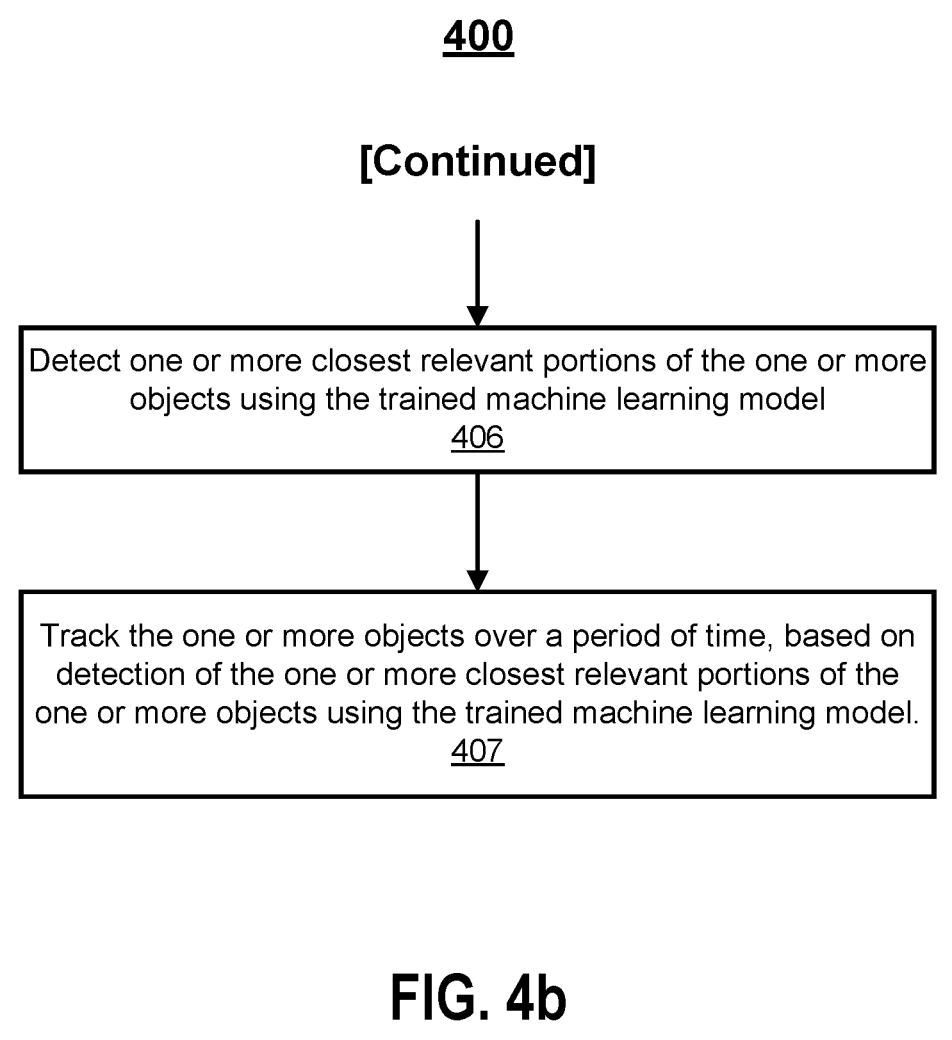

Detect one or more closest relevant portions of the one or more objects using the trained machine learning model
406

Track the one or more objects over a period of time, based on detection of the one or more closest relevant portions of the one or more objects using the trained machine learning model.
407

FIG. 4b

SYSTEMS AND METHODS FOR DETECTING AND TRACKING OBJECTS IN AN ENVIRONMENT OF AN AUTONOMOUS VEHICLE

FIELD

This disclosure relates generally to systems and methods for detecting and tracking objects in an environment of an autonomous vehicle.

BACKGROUND

Autonomous vehicles refer to vehicles that replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration. Thus, there should be a high degree of confidence that automated vehicles will not collide with rare things or things the perception system has never seen before, while performing well in nominal cases with common and known object types.

Therefore, there is a need for effective systems and methods for detecting and tracking objects in an environment of an autonomous vehicle.

SUMMARY

This disclosure addresses the above need in a number of aspects. In one aspect, this disclosure provides a method for detecting and tracking objects in an environment of an autonomous vehicle. In some embodiments, the method comprises: receiving sensor data from at least one sensor of the autonomous vehicle, the sensor data representative of one or more portions of an object in the environment of the autonomous vehicle; and using a processor: (i) determining a highest confidence portion of the object, wherein the highest confidence portion of the object comprises a portion of the object that is observed and estimated with highest accuracy and confidence; (ii) determining features of the highest confidence portion of the object; (iii) training a machine learning model based at least in part on the features of the highest confidence portion of the object and an error metric that measures difference between the highest confidence portion of the object and a corresponding portion of the object in a ground truth; and (iv) detecting or tracking one or more objects in the environment of the autonomous vehicle using the trained machine learning model.

In some embodiments, the object is a vehicle in the environment of the autonomous vehicle.

In some embodiments, at least one sensor comprises a LIDAR. In some embodiments, the sensor data comprises a point cloud representative of the object in the environment of the autonomous vehicle.

In some embodiments, the step of determining the highest confidence portion of the object comprises determining the highest confidence portion of the object based on the position or orientation of the object with respect to a longitudinal axis of the autonomous vehicle.

In some embodiments, the step of determining the features of the highest confidence portion of the object comprises determining a feature vector based on the features of the highest confidence portion of the object.

In some embodiments, the method comprises passing the feature vector through the machine learning model (e.g., convolutional neural network (CNN)) to generate a measurement in a measurement space.

In some embodiments, the method comprises modifying the measurement space to capture a current position of the closest corners of the object to the autonomous vehicle.

In some embodiments, the highest confidence portion of the object does not include a center or other portions of the object that are not closest to the autonomous vehicle. In some embodiments, the highest confidence portion of the object comprises a corner of the object that is closest to the autonomous vehicle. In some embodiments, the highest confidence portion of the object comprises an edge or plane of the object that is closest to the autonomous vehicle.

In some embodiments, the machine learning model comprises a neural network. In some embodiments, the neural network comprises a convolutional neural network (CNN).

In some embodiments, the step of detecting or tracking one or more objects in the environment of the autonomous vehicle comprises detecting one or more highest confidence portions of the one or more objects using the trained machine learning model.

In some embodiments, the step of detecting or tracking one or more objects in the environment of the autonomous vehicle comprises tracking the one or more objects over a period of time, based on detection of the one or more highest confidence portions of the one or more objects using the trained machine learning model.

In another aspect, this disclosure provides a system for detecting and tracking objects in an environment of an autonomous vehicle. In some embodiments, the system comprises: at least one sensor, configured to receive sensor data representative of one or more portions of an object in the environment of the autonomous vehicle; and a processor, configured to: (a) determine a highest confidence portion of the object, wherein the highest confidence portion of the object comprises a portion of the object that is observed and estimated with highest accuracy and confidence; (b) determine features of the highest confidence portion of the object; (c) train a machine learning model based at least in part on the features of the highest confidence portion of the object and an error metric that measures difference between the highest confidence portion of the object and a corresponding portion of the object in a ground truth; and (d) detect or track one or more objects in the environment of the autonomous vehicle using the trained machine learning model.

In some embodiments, the object is a vehicle in the environment of the autonomous vehicle.

In some embodiments, at least one sensor comprises a light detection and ranging (LIDAR). In some embodiments, the sensor data comprises a point cloud representive of the object in the environment of the autonomous vehicle.

In some embodiments, the processor is configured to determine the highest confidence portion of the object based on the position or orientation of the object with respect to a longitudinal axis of the autonomous vehicle. In some embodiments, the processor is configured to determine a feature vector based on the features of the highest confidence portion of the object. In some embodiments, the processor is configured to pass the feature vector through the machine learning model (e.g., convolutional neural network (CNN)) to generate a measurement in a measurement space.

In some embodiments, the processor is further configured to modify the measurement space to capture a current position of the closest corners of the object to the autonomous vehicle.

In some embodiments, the highest confidence portion of the object does not include a center or other portions of the object that are not closest to the autonomous vehicle.

In some embodiments, the highest confidence portion of the object comprises a corner of the object that is closest to the autonomous vehicle. In some embodiments, the highest confidence portion of the object comprises an edge or plane of the object that is closest to the autonomous vehicle.

In some embodiments, the machine learning model comprises a neural network. In some embodiments, the neural network comprises a convolutional neural network (CNN).

In some embodiments, the processor is configured to detect one or more highest confidence portions of the one or more objects using the trained machine learning model.

In some embodiments, the processor is further configured to track the one or more objects over a period of time, based on detection of the one or more highest confidence portions of the one or more objects using the trained machine learning model.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIG. 4*a* and FIG. 4*b* show for detecting and tracking objects in an environment of an autonomous vehicle, according to various embodiments of the present disclosure.

DETAILED DESCRIPTION

Figure 1:
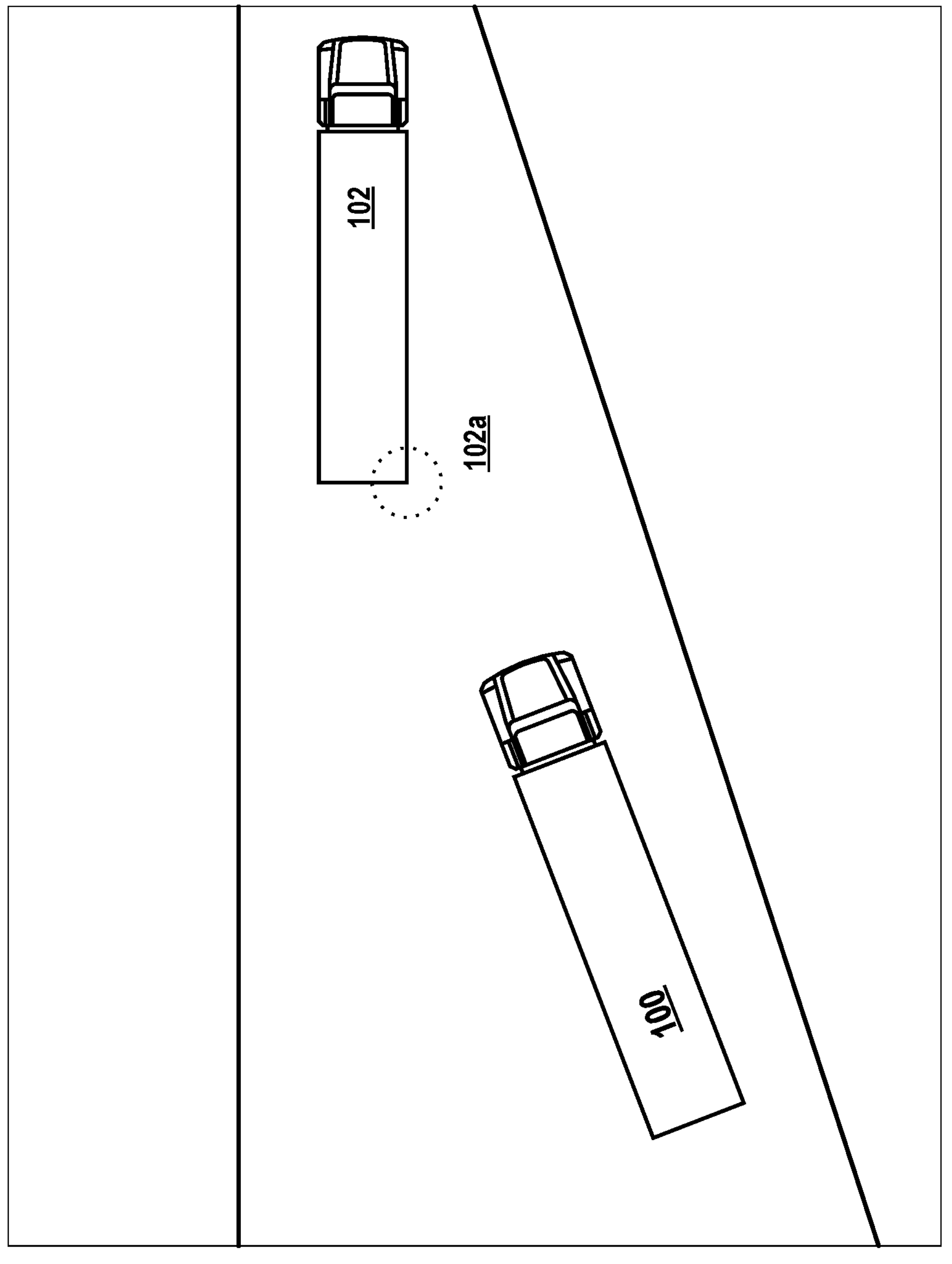
FIG. 1 shows an example method for detecting and tracking objects in an environment of an autonomous vehicle by a machine learning model trained with features of the highest confidence portion of objects, according to various embodiments of the present disclosure.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. Autonomous vehicles may be any type of vehicle including, but not limited to, cars, trucks, motorcycles, busses, recreational vehicles, agricultural vehicles, construction vehicles etc. According to various embodiments, autonomous vehicles may include a throttle control system and a braking system. Autonomous vehicles may include one or more engines and/or one or more computing devices. The one or more computing devices may be separate from the automated speed control system or the braking system. Additionally, the computing device may include a processor and/or a memory. The memory may be configured to store programming instructions that, when executed by the processor, are configured to cause the processor to perform one or more tasks. In certain embodiments, autonomous vehicles may include a receiver configured process the communication between autonomous vehicles and a teleoperation system.

The term "trajectory" or "map" is used broadly to include, for example, a motion plan or any path or route from one place to another; for instance, a path from a pickup location to a drop off location.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for detecting and tracking objects in an environment of an autonomous vehicle, according to embodiments of the present disclosure, will be described with reference to the accompanying drawings. In the drawings, the same reference numerals will be used throughout to designate the same or equivalent elements. In addition, a detailed description of well-known features or functions already well within the knowledge and skill of an ordinarily skilled artisan will be omitted in order not to unnecessarily obscure the gist of the present disclosure.

With reference to FIG. 1, autonomous vehicles, e.g., an autonomous vehicle 100, may be used to bring goods or passengers to desired locations safely. There must be a high degree of confidence that automated vehicles will not collide with objects (such as vehicles, pedestrians, and debris surrounding the autonomous vehicle). The autonomous vehicle 100 may employ a model, e.g., a machine learning model, to detect one or more objects in the environment of the autonomous vehicle 100. The model may be trained using various error metrics. For example, an example error matric used by the existing methods may be based on errors between centers of labels to centers of tracks or errors between the closest corners of labels and tracks. Labels represent a ground truth, for example, may be determined by observers, and tracks are determined by the model. Another example error metrics may be based on errors in the direction of the estimated path of potential collision between the object and the autonomous vehicle 100. However, such error metrics may not consider errors in particularly important edges (e.g., closest edge to the autonomous vehicle 100) to be more important than errors in other edges.

For example, PointPillars is a neural network that uses LIDAR data to produce detections, such as measurements representing objects (e.g., vehicles, pedestrians, and debris surrounding the autonomous vehicle 100). In some cases, the detections produced by PointPillars have been observed to be erroneous as compared to ground truth by up to two meters in certain directions. Furthermore, objects may occasionally be missed altogether. These cases are especially true for odd objects that were not in the training data or are seen infrequently. The fundamental problem is that the cuboid produced by PointPillars does not completely cover the LIDAR points in the ground truth cuboid. Ultimately, erroneous LIDAR detections are unwanted because they lead to erroneous object tracks, or worse, no track at all. This is especially problematic for near-field objects because it leads to suboptimal and potentially dangerous immediate planning.

Therefore, methods and systems are provided in this disclosure to improve LIDAR detections, such that near-field tracks and detections are quantifiability closer to ground truth and no near-field objects with LIDAR data are missed. In one aspect, this disclosure provides methods and systems for detecting and tracking objects in an environment of an autonomous vehicle 100 based on an optimized error metric. The optimized error metric may be calculated based on a relevant portion of an object, such as a corner 102*a* of the object (e.g., a neighboring vehicle 102). In one example, the relevant portion may include a portion of the object closest to the autonomous vehicle 100 and more likely to collide with the autonomous vehicle 100. Generally, the optimized error metric may not take into account the corners, planes, or edges of the object that are away from the autonomous vehicle 100, because theses corners, planes or edges are generally not observable or cannot be accurately detected by a LIDAR sensor and will increase computing burden and decrease detection accuracy. Thus, by only computing the relevant portion of the object with respect to the autonomous vehicle 100, the disclose methods and systems not only increase accuracy of detection and/or tracking of objects in the environment of the autonomous vehicle 100, but also increase computing efficiency of the system.

Figure 2:
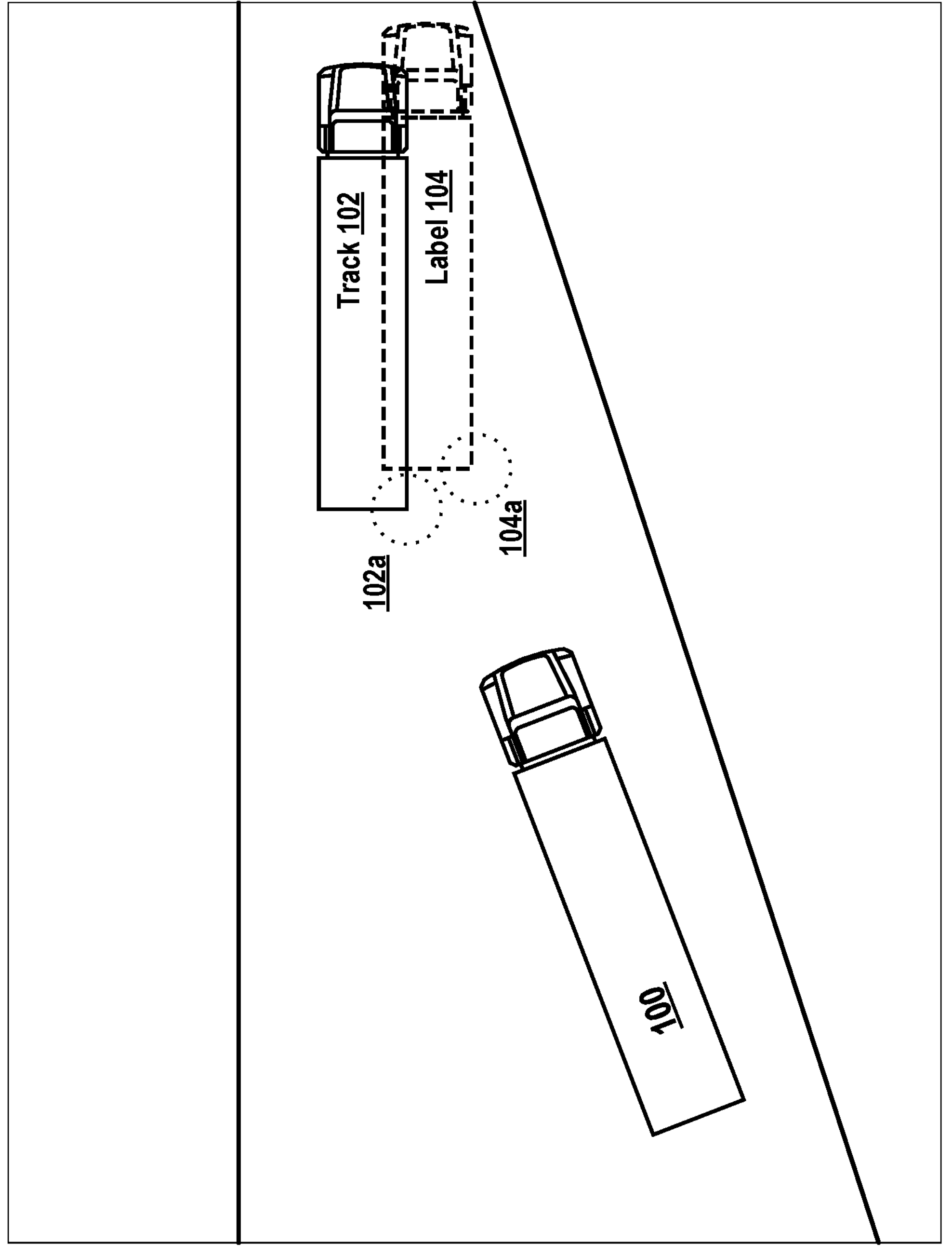
FIG. 2 shows an example method for detecting and tracking objects in an environment of an autonomous vehicle by a machine learning model trained with an error metric that measure differences between labels and tracks of the highest confidence portion of objects, according to various embodiments of the present disclosure.

Referring now to FIG. 2, an example method for detecting and tracking objects in an environment of an autonomous vehicle is depicted, according to various embodiments of the present disclosure. In some embodiments, the method for detecting and tracking objects may be carried out by a machine learning model. In some embodiments, the machine learning model may be trained with an error metric that measure differences between labels and tracks of the highest confidence portion of objects. As used herein, the term "labels" refers to ground truth data corresponding to manually generated labeling generated by manual annotation, for example, by human observers. As used herein, the term "tracks" refers to data obtained from prediction by an object detection or tracking model. For example, the error metric may be calculated based on a difference between a track 102 and a label 104, such as a difference between the closest portion 102*a* of the track 102 with respect to the autonomous vehicle 100 and the corresponding portion 104*a* of the label 104.

As used herein, the term "highest confidence portion" refers to a portion or portions that can be observed and estimated with highest accuracy and confidence. In some embodiments, the highest confidence portion of an object may include a portion of an object that is closest to the autonomous vehicle based on a position or orientation of the object with respect to the autonomous vehicle. In such a context, the highest confidence portion may also be referred to as the closest relevant portion.

Figure 3:
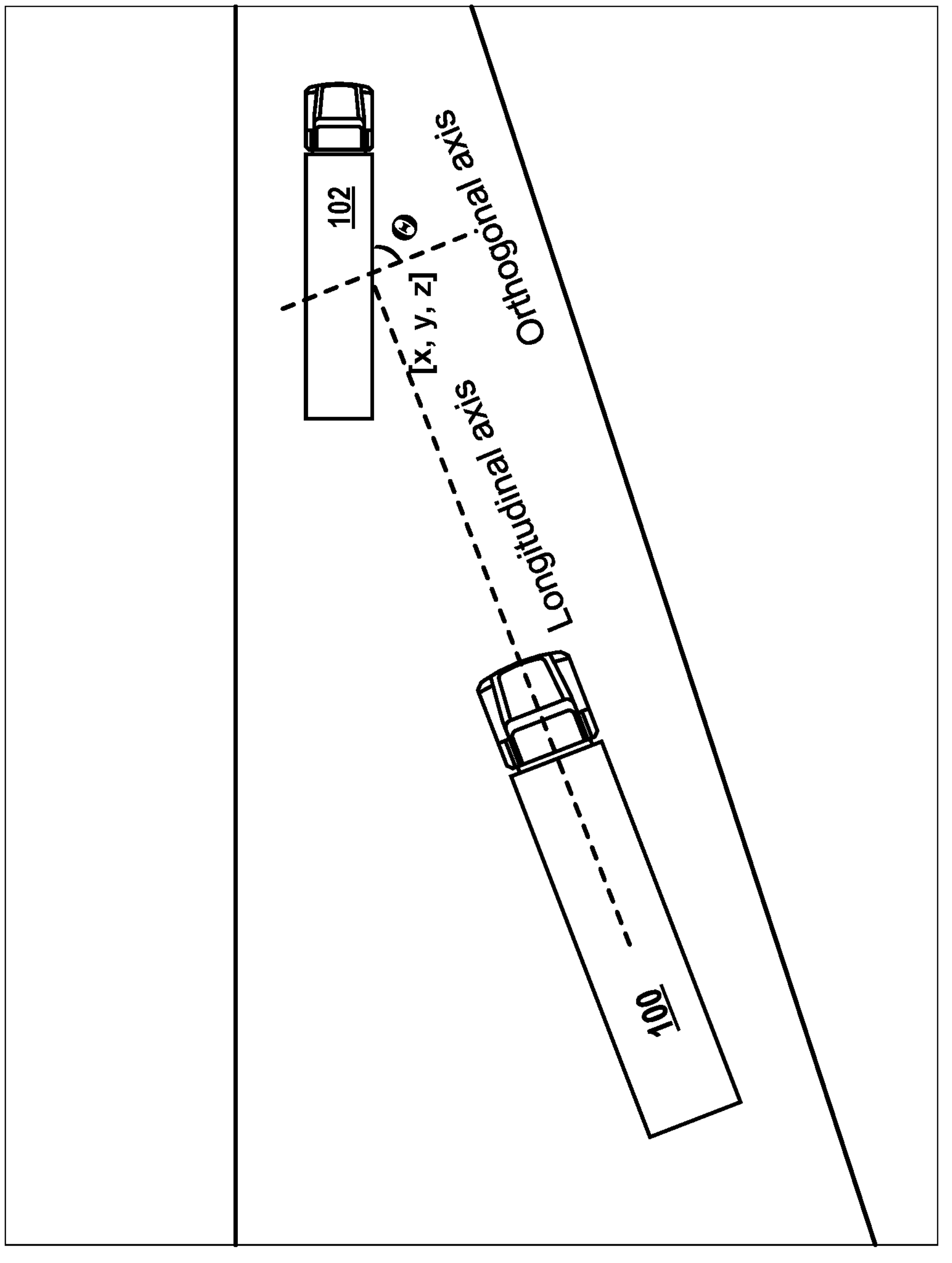
FIG. 3 shows an example process for determining the feature vector in the measurement space defined by x, y, z, l, w, h, and Θ, according to various embodiments of the present disclosure. 1, w, and h are the length, width, and height of measurement of the object as determined in current measurement space; x, y, z denote a 3-dimensional position of a closest corner of the measurement to the autonomous vehicle; and Θ represents heading of the measurement with respect to an orthogonal of the autonomous vehicle.

Referring now to FIG. 3, an example method for detecting and tracking objects in an environment of an autonomous vehicle 100 is depicted, according to various embodiments of the present disclosure. In some embodiments, the method may include determining the highest confidence portion of the object based on the position or orientation of the object with respect to a longitudinal axis of the autonomous vehicle 100. An example longitudinal axis of the autonomous vehicle 100 is shown in FIG. 3.

In some embodiments, the method may include determining features of the highest confidence portion of an object in the environment of the autonomous vehicle 100. In some embodiments, the features of the highest confidence portion of the object may be represented by a feature vector. As used herein, the term "feature vector" refers to a vector of numeric values or a multi-dimensional dataset representing characteristics and attributes of a highest confidence portion of an object in the environment of the autonomous vehicle 100.

In some embodiments, the method may include passing the feature vector through a machine learning model, such as convolutional neural network (CNN), to generate a measurement in a measurement space.

In some embodiments, the measurement space may be defined by x, y, z, l, w, h, and Θ, wherein: l, w, and h are the length, width, and height of measurement of the object as determined in current measurement space; x, y, z denote a 3-dimensional position of a closest corner of the measurement to the autonomous vehicle; and Θ represents heading of the measurement with respect to an orthogonal of the autonomous vehicle.

Referring now to FIG. 4*a* and FIG. 4*b*, an example method 400 for for detecting and tracking various objects in an environment of an autonomous vehicle is depicted, in accordance with various embodiments of the present disclosure.

At 401, the method may include receiving sensor data from at least one sensor of the autonomous vehicle, the sensor data representative of one or more portions of an object in the environment of the autonomous vehicle.

In some embodiments, objects may include, e.g., vehicles, pedestrians, and debris surrounding the autonomous vehicle. Vehicles may be any automobiles, such as cars, trucks, sports utility vehicles, vans, buses, commercial vehicles, etc. In some embodiments, the objects may include one or more neighboring vehicles in the environment of the autonomous vehicle.

Sensors may include, but are not limited to: LIDAR, RADAR, cameras, monocular or stereo video cameras in the visible light, infrared and/or thermal spectra; ultrasonic sensors, time-of-flight (TOF) depth sensors, speed sensors, temperature sensors, and rain sensors. Accordingly, the sensor data may include LIDAR data, RADAR data, camera data, or any range-sensing or localization data, etc. According to various embodiments, a sensor stream of one or more sensors (e.g., of the same or different modalities) may be fused to form fused sensor data.

In some embodiments, at least one sensor may include a LIDAR. In some embodiments, the sensor data may include a point cloud representative of the object in the environment of the autonomous vehicle. A point cloud refers to a set of data points, in this example, captured by a LIDAR device at a particular point in time. Each data point is associated with location information of the data point (e.g., x, y, and z coordinates).

At 402, the method may include detecting a highest confidence portion of the object. In some embodiments, the highest confidence portion of the object may include a portion of the object that is observed and estimated with highest accuracy and confidence.

In some embodiments, the method may include detecting various objects in the physical environment of the autonomous vehicle by an object detection system. The objects may belong to one or more classes, such as cars, trucks, buses, etc. In some embodiments, the object detection system may utilize a neural network, e.g., a deep convolutional neural network (DCNN), for object detection. In addition, the same neural network (e.g., deep convolutional neural network) can also predicts the centroid locations or other portions for each detected instance.

In some embodiments, the step of determining the highest confidence portion of the object may include determining the highest confidence portion of the object based on the position or orientation of the object with respect to a longitudinal axis of the autonomous vehicle. An example longitudinal axis of the autonomous vehicle is illustrated in FIG. 3.

In some embodiments, the highest confidence portion of the object does not include a center or other portions of the object that are not closest to the autonomous vehicle. As stated above, unlike the existing methods, the disclosed methods do not include corners, planes, or edges of the object that are away from the autonomous vehicle, because theses corners, planes or edges are generally not observable or cannot be accurately detected by a LIDAR sensor and will increase computing burden and decrease detection accuracy. Accordingly, by only computing the relevant portion of the object with respect to the autonomous vehicle, the disclose methods have improved computing efficiency and accuracy of detection and tracking of various objects in the environment of the autonomous vehicle.

In some embodiments, the highest confidence portion of the object may include a corner of the object that is closest to the autonomous vehicle. Alternatively and/or additionally, the highest confidence portion of the object may include an edge or plane of the object that is closest to the autonomous vehicle.

At 403, the method may include determining features of the highest confidence portion of the object. In some embodiments, the features of the highest confidence portion of the object may be represented by a feature vector. In some embodiments, the method may include passing the feature vector through a convolutional neural network to generate a measurement in a measurement space.

In some embodiments, the method may include determining the feature vector in a measurement space. In some embodiments, the measurement space may be defined by <c1_x, c1_y, c2_x, c2_y, non_collision_edge_length, h, z>, where c1_x and c1_y (or corner_1_x and corner_1_y) denote the position of the first corner, and c2_x and c2_y (or corner_2_x and corner_2_y) denote the position of the second corner. non_collision_edge_length denotes the Euclidean length of the box edge that is adjacent to the collision edge. h denotes the height of the box. z denotes the z coordinate of the center of the box.

For example, the PointPillars neural network may be adapted to take the current frame of LIDAR point cloud data as input and outputs a vector in measurement space for each detection it makes. Measurement space may consist of the 3-dimensional point that is the center of the detection, the 3 dimensions (length, width, height) of the detection, and the heading.

In some embodiments, the method may include modifying the measurement space to capture a current position of the closest corners of the object to the autonomous vehicle. Because the LIDAR measurement space is being changed, the process taken to produce measurement from LIDAR data must also be changed accordingly. For example, the PointPillars neural network may be configured to produce values for the position of the closest plane (or coner) of an object rather than the center of the object. In addition, to reduce uncertainty of PointPillars' predictions of the closest plane (or corner) of the object, the method may include adding the newly created track-label error metric to the PointPillars loss function with certain weightage.

At 404, the method may include training a machine learning model based at least in part on the features of the highest confidence portion of the object and an error metric that measures difference between the highest confidence portion of the object and a corresponding portion of the object in a ground truth. As used herein, the term "ground truth" refers to manually generated labeling of objects by manual annotation, for example, by human observers.

In some embodiments, the machine learning model may include a neural network (e.g., artificial neural network). In some embodiments, the neural network may include a convolutional neural network (CNN).

As used herein, the term "artificial neural network (ANN)" refers to machine learning modules for pattern recognition. Neural networks are constructed of processing elements known as neurons. Neurons are interconnected and arranged in a plurality of layers. Each neuron can have multiple inputs but generally only one output, which, in turn, is usually connected to many or all other neurons in the next layer. Neural networks learn by extracting relational information from the data and the desired output. A neural network in the machine learning module is initially trained or fed large amounts of data. In some embodiments, the machine learning module may employ a plurality of neural networks, which may be organized either in series, in parallel, or in a nested fashion. For example, a primary neural network may identify an abnormality of a chassis component and attempts to identify the possible source. The neural networks can be arranged in a tree pattern or in a hierarchical structure, with each neural network trained to perform a particular pattern recognition task. A group of such neural networks may be coupled to other groups of neural networks to handle more complex tasks.

Convolutional neural networks (CNNs) (e.g., deep convolutional neural networks (DCNN)) are the predominant types of neural networks used for multi-dimensional signal processing. The term deep refers generically to networks having from a "few" to several dozen or more convolution layers, and deep learning refers to methodologies for training these systems to automatically learn their functional parameters using data representative of a specific problem domain of interest. CNNs are currently being used in a broad spectrum of application areas, all of which share the common objective of being able to automatically learn features from (typically massive) databases and to generalize their responses to circumstances not encountered during the learning phase. Ultimately, the learned features can be used for tasks such as classifying the types of signals the CNN is expected to process.

At 405, the method may include detecting or tracking one or more objects in the environment of the autonomous vehicle using the trained machine learning model. At 406, the method may include detecting one or more highest confidence portions of the one or more objects using the trained machine learning model. In some embodiments, the object detection system may utilize the machine learning model trained with one or more highest confidence portions of the one or more objects in the environment of the autonomous vehicle. Since the machine learning model has been trained with the highest confidence portions of objects in the environment of the autonomous vehicle, it can more accurately and efficiently detect the portions of the objects that are likely to collide with the autonomous vehicle.

At 407, the method may include tracking one or more objects over a period of time, based on detection of the one or more highest confidence portions of the one or more objects using the trained machine learning model. In some embodiments, one or more objects may be tracked over a period of time by a tracking system. In some embodiments, the tracking system may be configured to operate based only on input from one or more sensors. In some embodiments, the tracking system may be configured to operate based on input from the object detection system. In some embodiments, the tracking system can also be configured to incorporate other types of information to aid in the tracking. For example, various other techniques for measuring, estimating, and/or predicting speed, relative positions, and/or orientations of the autonomous vehicle and/or objects.

In some embodiments, the tracking system may employ prediction by Kalman filtering (e.g., Kalman filter (KF), extended Kalman filter (EKF), unscented Kalman filter (UKF)). An UKF may predict the current timestamp's full state given all previous timestamp's states. For example, the state at timestamp 0 is estimated using track initiation, which leverages associations from the 3 prior frames of detections. In some embodiments, the method may include updating the UKF. The UKF then uses the measurement model to convert this prediction from a state space to measurement space in order to update the full state using the measurement vector produced from the PointPillars neural network.

Figure 5:
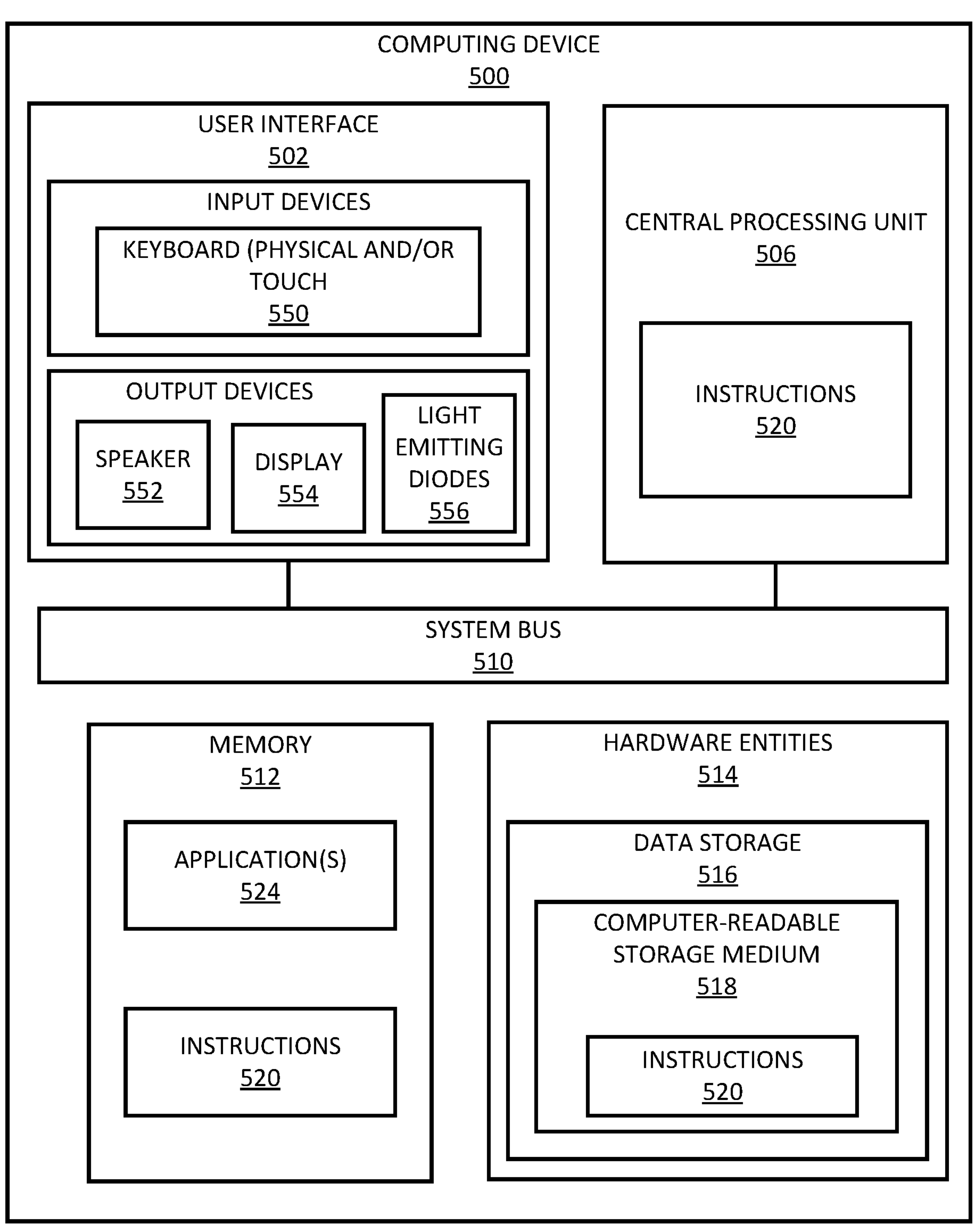
FIG. 5 shows example elements of a computing device, according to various embodiments of the present disclosure.

Referring now to FIG. 5, an illustration of an example architecture for a computing device 500 is provided. Computing device 500 may include more or fewer components than those shown in FIG. 1. The hardware architecture of FIG. 5 represents one example implementation of a representative computing device configured to one or more methods and means for controlling the autonomous vehicle 100 in response to an abnormal condition of the autonomous vehicle 100, as described herein. As such, the computing device 500 of FIG. 5 implements at least a portion of the method(s) described herein (for example, method 400 of FIG. 4*a* and FIG. 4*b*).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through a system bus 510, and hardware entities 514 connected to the system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a data storage 516 comprising a computer-readable storage medium 518 on which is stored one or more sets of instructions 520 (e.g., programming instructions, such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media," as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
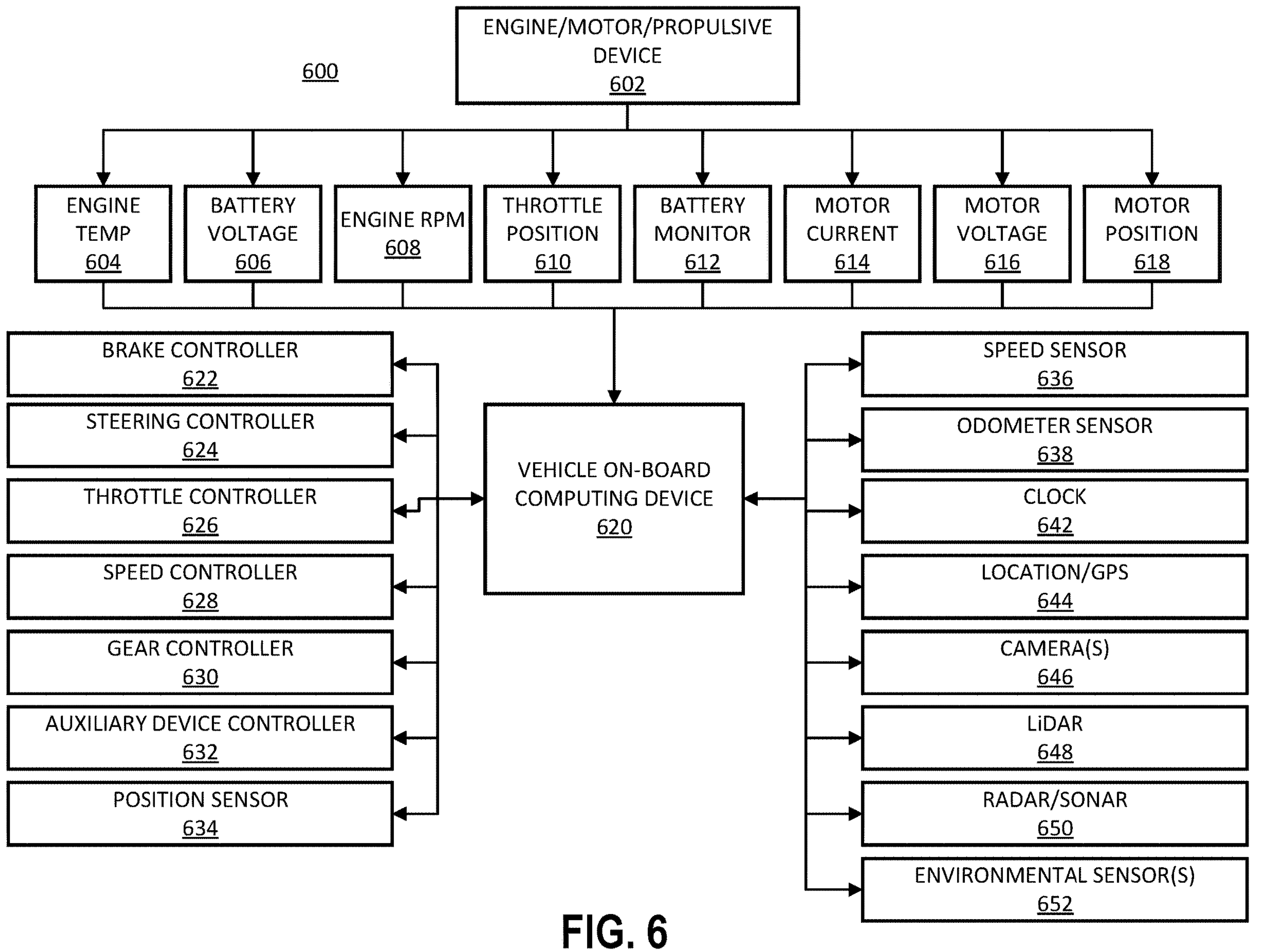
FIG. 6 shows an example architecture of a vehicle, according to various embodiments of the present disclosure.

Referring now to FIG. 6, an example vehicle system architecture 600 for a vehicle is provided, in accordance with various embodiments of the present disclosure.

The autonomous vehicle 100 of FIG. 1 can have the same or similar system architecture as shown in FIG. 6. Thus, the following discussion of vehicle system architecture 600 is sufficient for understanding the autonomous vehicle 100 of FIG. 1.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example, a position sensor 634, such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620. It may be a separate device, or multiple clocks may be available.

The vehicle system architecture 600 also may include various sensors that operate to gather information about the environment in which the vehicle is traveling. These sensors may include, for example, a location sensor 644 (for example, a Global Positioning System (GPS) device); object detection sensors such as one or more cameras 646; a LiDAR sensor system 648; and/or a radar and/or a sonar system 650. The sensors also may include environmental sensors 652, such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an onboard computing device 620. The onboard computing device 620 may be configured to analyze the data captured by the sensors and/or data received from data providers, and may be configured to optionally control operations of the vehicle system architecture 600 based on the results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the onboard computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 are communicated from those sensors to the onboard computing device 620. The object detection information and/or captured images are processed by the onboard computing device 620 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of detecting and tracking objects in an environment of an autonomous vehicle, comprising:

receiving sensor data from at least one sensor of the autonomous vehicle, the sensor data representative of one or more portions of an object in the environment of the autonomous vehicle; and using a processor:

determining a highest confidence portion of the object, wherein the highest confidence portion of the object comprises a portion of the object that is observed and estimated with highest accuracy and confidence;

determining features of the highest confidence portion of the object;

training a machine learning model based at least in part on the features of the highest confidence portion of the object and an error metric that measures difference between the highest confidence portion of the object and a corresponding portion of the object in a ground truth, wherein the highest confidence portion of the object comprises a corner of a neighboring vehicle; and detecting or tracking one or more objects in the environment of the autonomous vehicle using the trained machine learning model.

2. The method of claim 1, wherein the step of determining the highest confidence portion of the object comprises determining the highest confidence portion of the object based on the position or orientation of the object with respect to a longitudinal axis of the autonomous vehicle.

3. The method of claim 1, wherein the step of determining the features of the highest confidence portion of the object comprises determining a feature vector based on the features of the highest confidence portion of the object.

4. The method of claim 3, comprising passing the feature vector through the machine learning model to generate a measurement in a measurement space.

5. The method of claim 4, comprising modifying the measurement space to capture a current position of the closest corners of the object to the autonomous vehicle.

6. The method of claim 1, wherein the highest confidence portion of the object does not include a center or other portions of the object that are not closest to the autonomous vehicle.

7. The method of claim 1, wherein the highest confidence portion of the object comprises two corners of the object that is closest to the autonomous vehicle.

8. The method of claim 1, wherein the highest confidence portion of the object comprises an edge or plane of the object that is closest to the autonomous vehicle.

9. The method of claim 1, wherein the object is a vehicle in the environment of the autonomous vehicle.

10. The method of claim 1, wherein the machine learning model comprises a neural network.

11. The method of claim 10, wherein the neural network comprises a convolutional neural network (CNN).

12. The method of claim 1, wherein at least one sensor comprises a light detection and ranging (LIDAR).

13. The method of claim 1, wherein the step of detecting or tracking one or more objects in the environment of the autonomous vehicle comprises detecting one or more highest confidence portions of the one or more objects using the trained machine learning model.

14. The method of claim 13, wherein the step of detecting or tracking one or more objects in the environment of the autonomous vehicle comprises tracking the one or more objects over a period of time, based on detection of the one or more highest confidence portions of the one or more objects using the trained machine learning model.

15. A system for detecting and tracking objects in an environment of an autonomous vehicle, comprising:

at least one sensor, configured to receive sensor data representative of one or more portions of an object in the environment of the autonomous vehicle; and a processor, configured to:

determine a highest confidence portion of the object, wherein the highest confidence portion of the object comprises a portion of the object that is observed and estimated with highest accuracy and confidence;

determine features of the highest confidence portion of the object;

train a machine learning model based at least in part on the features of the highest confidence portion of the object and an error metric that measures difference between the highest confidence portion of the object and a corresponding portion of the object in a ground truth, wherein the highest confidence portion of the object comprises a corner of a neighboring vehicle; and detect or track one or more objects in the environment of the autonomous vehicle using the trained machine learning model.

16. The system of claim 15, wherein the processor is configured to determine the highest confidence portion of the object based on the position or orientation of the object with respect to a longitudinal axis of the autonomous vehicle.

17. The system of claim 16, wherein the processor is configured to determine a feature vector based on the features of the highest confidence portion of the object.

18. The system of claim 17, wherein the processor is configured to pass the feature vector through the machine learning model to generate a measurement in a measurement space.

19. The system of claim 18, wherein the processor is further configured to modify the measurement space to capture a current position of the closest corners of the object to the autonomous vehicle.

20. The system of claim 15, wherein the highest confidence portion of the object does not include a center or other portions of the object that are not closest to the autonomous vehicle.

21. The system of claim 15, wherein the highest confidence portion of the object comprises two corners of the object that is closest to the autonomous vehicle.

22. The system of claim 15, wherein the highest confidence portion of the object comprises an edge or plane of the object that is closest to the autonomous vehicle.

23. The system of claim 15, wherein the object is a vehicle in the environment of the autonomous vehicle.

24. The system of claim 15, wherein the machine learning model comprises a neural network.

25. The system of claim 24, wherein the neural network comprises a convolutional neural network (CNN).

26. The system of claim 15, wherein at least one sensor comprises a light detection and ranging (LIDAR).

27. The system of claim 15, wherein the processor is configured to detect one or more highest confidence portions of the one or more objects using the trained machine learning model.

28. The system of claim 27, wherein the processor is further configured to track the one or more objects over a period of time, based on detection of the one or more highest confidence portions of the one or more objects using the trained machine learning model.

* * * * *